US007952059B2

(12) United States Patent
Vitale et al.

(10) Patent No.: US 7,952,059 B2
(45) Date of Patent: *May 31, 2011

(54) VIEWING SYSTEM FOR AUGMENTED REALITY HEAD MOUNTED DISPLAY WITH ROTATIONALLY SYMMETRIC ASPHERIC LENSES

(75) Inventors: Anthony Vitale, Bay Harbor Island, FL (US); James A. Carter, III, Indialantic, FL (US)

(73) Assignee: Eyes of God, Inc., Miami, FL (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/138,641

(22) Filed: Jun. 13, 2008

(65) Prior Publication Data

US 2009/0051879 A1    Feb. 26, 2009

Related U.S. Application Data

(60) Provisional application No. 60/943,638, filed on Jun. 13, 2007, provisional application No. 61/023,664, filed on Jan. 25, 2008.

(51) Int. Cl.
*H01L 27/00* (2006.01)

(52) U.S. Cl. ...................................... 250/208.1; 250/216

(58) Field of Classification Search ............... 250/208.1, 250/216, 214 VT; 353/28, 31, 74, 75; 345/7–9; 359/630–634, 362–366
See application file for complete search history.

(56) References Cited

U.S. PATENT DOCUMENTS

| | | | |
|---|---|---|---|
| 5,406,415 A * | 4/1995 | Kelly | 359/633 |
| 6,222,676 B1 | 4/2001 | Togino et al. | 359/630 |
| 7,450,310 B2 | 11/2008 | McGuire | 359/630 |
| 2004/0108971 A1 | 6/2004 | Waldern et al. | 345/8 |
| 2005/0168616 A1 | 8/2005 | Rastegar et al. | 348/335 |
| 2005/0190456 A1 | 9/2005 | Nishioka et al. | 359/676 |
| 2006/0247660 A1 | 11/2006 | Perez | 606/107 |
| 2006/0250696 A1 | 11/2006 | McGuire | 359/630 |

OTHER PUBLICATIONS

The Code V Reference Manual, vol. 1, Ch. 4, p. 4-75, Oct. 2006, by Optical Research Associates.
Schott Faceplates, Sep. 2006.
Microvision, Nomad Display System, Jun. 10, 2007.
"How The VRD Works" by Washington University, Human Interface Technology Lab, Jan. 23, 2001.
Virtual Retinal Display Technology at http:-www-cs.nps.navy.mil/people/faculty/capps/4473/projects/ffiambolis/vrd/ Jul. 29, 2006.

(Continued)

*Primary Examiner* — Que T Le
(74) *Attorney, Agent, or Firm* — Robert C. Kain, Jr.

(57) ABSTRACT

The method and system focuses a projected image with a multiple rotationally symmetric aspheric surfaces and an ellipsoidal reflector-relay onto or in a user's eye. The image is projected from the first elliptical foci and is focused on the eye at the second foci. A peripherally mounted outboard projector unit uses three lenses and a substantially flat projector surface. Alternatively, an inboard mounted projector unit uses two lenses with non-rotationally symmetric aspheric surfaces and a biconic projector surface (organic light emitting diode (OLED) or curved silicon). The image projector-lens system and the ellipsoid pupil relay are correctly positioned on the head of the user by a head mount system which may be goggles, eye glasses worn by the user, or screens or shields depending from a head piece or helmet worn by the user.

19 Claims, 25 Drawing Sheets

OTHER PUBLICATIONS

"For a Cheaper Camera, Use Curved Silicon," by H. Hogan, Technology World, May 2008.

PCT/US 08/07409, Patent Cooperation Treaty (PCT) International Search Report, Nov. 13, 2008.

* cited by examiner

Three Lens User Defined Surface Table A - FIG. 5A

```
CODE V> list
    Wearable Display UDS
            RDY                 THI         RMD         GLA              CCY     THC     GLC
OBJ:    INFINITY            INFINITY                                    100     100
STO:    INFINITY            0.000000                                    100     100
    XDE:    0.000000    YDE:    0.000000    ZDE:    0.000000
    XDC:    100         YDC:    100         ZDC:    100
    ADE:    0.000000    BDE:    -10.000000  CDE:    0.000000
    ADC:    100         BDC:    100         CDC:    100

2:      INFINITY            38.400000                               100     100
    XDE:    0.000000    YDE:    0.000000    ZDE:    0.000000
    XDC:    100         YDC:    100         ZDC:    100
    ADE:    0.000000    BDE:    0.000000    CDE:    0.000000
    ADC:    100         BDC:    100         CDC:    100

3:      36.00000            -19.200000  REFL                        100     100
    UDS:
    IC :    CLO
    UCO/UCC
    C1 :    3.8400E+01      (Semidiameter in X (cux))
    C82:    3.8390E+01      (Unused)
    C83:    3.5900E+01      (Unused)
    C1 :    100             C82:                    C83:
    C84:    3.6000E+01      (Unused)
    C84:
    XDE:    0.000000    YDE:    0.000000    ZDE:    0.000000    BEN
    XDC:    100         YDC:    100         ZDC:    100
    ADE:    0.000000    BDE:    20.364000   CDE:    0.000000
    ADC:    100         BDC:    100         CDC:    100
    UMR UDS: cv_uds_wds >   4:      INFINITY            -17.711695                              100     0
    5:      -7.11384            -2.000000   SPHM52_OHARA                0       100
    ASP:
    K  :    -1.909154   KC :    0
    IC :    YES         CUF:    0.000000    CCF:    100
    A  :0.348125E-03    B  :0.699793E-04    C  :0.474835E-06    D  :0.237688E-06
    AC :    0           BC :    0           CC :    0           DC :    0
    XDE:    0.000000    YDE:    0.000000    ZDE:    0.000000
    XDC:    100         YDC:    100         ZDC:    100
    ADE:    0.000000    BDE:    13.823664   CDE:    0.000000
    ADC:    100         BDC:    0           CDC:    100

6:      -18.50627           -1.086121                               0       0
    7:      -13.78817           -3.500000   SLAH58_OHARA                0       100
    8:      7.00060             -1.500000                               0       100
    9:      4.77619             -2.100000   SNPH2_OHARA                 0       100
    10:     8.48705             -4.080176                               0       100
    ASP:
    K  :    -1.322807   KC :    0
    IC :    YES         CUF:    0.000000    CCF:    100
    A  :-.344431E-03    B  :-.167925E-04    C  :0.379928E-06    D  :0.438885E-09
    AC :    0           BC :    0           CC :    0           DC :    0

11:     INFINITY            0.000000                                100     0
    12:     INFINITY            0.000000                                100     100
    XDE:    0.000000    YDE:    0.000000    ZDE:    0.000000
    XDC:    100         YDC:    100         ZDC:    100
    ADE:    0.000000    BDE:    17.152354   CDE:    0.000000
    ADC:    100         BDC:    0           CDC:    100

IMG:    51.24546            0.000000                                0       100
    YTO:
    RDX:    INFINITY    CCX:    100
    K  :    0.000000    KC :    100         IC :    YES
```

Three Lens User Defined Surface Table A – FIG. 5B

A : -.804933E-04    B : -.246660E-06    C : 0.000000E+00    D : 0.000000E+00
AC :        0       BC :        0       CC :        100     DC :        100

SPECIFICATION DATA
EPD   3.000000
DIM        MM
WL   642.73    590.86    542.02    500.48    465.61
REF        3
WTW        7
XAN   0.00000   10.00000   30.00000  -10.00000  -30.00000
      0.00000   10.00000   30.00000  -10.00000  -30.00000
      0.00000   10.00000   30.00000  -10.00000  -30.00000
      0.00000    0.00000    0.00000    0.00000    0.00000
     10.00000   10.00000   10.00000   10.00000   10.00000
YAN  30.00000   30.00000   30.00000   30.00000   30.00000
WTF   1.00000    1.00000    1.00000    1.00000    1.00000
      1.00000    1.00000    1.00000    1.00000    1.00000
      1.00000    1.00000    1.00000    1.00000    1.00000
      0.00000   -0.03109   -0.10180    0.03109    0.10180
VUX   0.00047   -0.03061   -0.10129    0.03155    0.10222
      0.00499   -0.02595   -0.09631    0.03592    0.10628
      0.00000   -0.03109   -0.10180    0.03109    0.10180
VLX   0.00047   -0.03061   -0.10129    0.03155    0.10222
      0.00499   -0.02595   -0.09631    0.03592    0.10628
     -0.01543   -0.01543   -0.01543   -0.01543   -0.01543
VUY  -0.01543   -0.01543   -0.01543   -0.01543   -0.01543
     -0.01543   -0.01543   -0.01543   -0.01543   -0.01543
     -0.01543   -0.01543   -0.01543   -0.01543   -0.01543
VLY  -0.01543   -0.01543   -0.01543   -0.01543   -0.01543
     -0.01543   -0.01543   -0.01543   -0.01543   -0.01543
POL        N

APERTURE DATA/EDGE DEFINITIONS
CA
ELX S3    38.300000
ELY S3    35.900000

Three Lens User Defined Surface Table A - FIG. 5B(cont'd)

| PRIVATE CATALOG | | | | | | |
|---|---|---|---|---|---|---|
| PWL | 1013.98 | 852.11 | 706.52 | 656.27 | 643.85 | |
| 587.56 | | | | | | |
| 'PMMAO' | 546.07 | 486.13 | 479.99 | 435.84 | 404.66 | |
| 1.491757 | 1.483115 | 1.484965 | 1.487787 | 1.489201 | 1.489603 | |
| 'P-STYRO' | 1.493795 | 1.497760 | 1.498258 | 1.502557 | 1.506607 | |
| 1.590481 | 1.572553 | 1.576196 | 1.581954 | 1.584949 | 1.585808 | |
| 'P-CARBO' | 1.595010 | 1.604079 | 1.605241 | 1.615446 | 1.625341 | |
| 1.585470 | 1.567248 | 1.570981 | 1.576831 | 1.579864 | 1.580734 | |
| 'SANO' | 1.590081 | 1.599439 | 1.600654 | 1.611519 | 1.622447 | |
| 1.567440 | 1.551870 | 1.555108 | 1.560119 | 1.562700 | 1.563438 | |
| | 1.571300 | 1.579000 | 1.579985 | 1.588640 | 1.597075 | |
| PWL | 643.90 | 587.60 | 546.10 | 480.00 | | |
| 'PEIO' | 1.651000 | 1.660000 | 1.668000 | 1.687000 | | |
| PWL | 656.30 | 587.60 | 486.10 | | | |
| 'PCHMAO' | 1.502000 | 1.505000 | 1.511000 | | | |

| REFRACTIVE INDICES | | | | | | |
|---|---|---|---|---|---|---|
| GLASS CODE | 642.73 | 590.86 | 542.02 | 500.48 | | |
| SLAH5B_OHARA | 1.877667 | 1.882635 | 1.888716 | 1.895448 | | |
| SNPH2_OHARA | 1.911469 | 1.922072 | 1.935584 | 1.951282 | | |
| SPHM52_OHARA | 1.615551 | 1.617835 | 1.620583 | 1.623575 | | |

Three Lens User Defined Surface Table A - FIG. 5C

No solves defined in system

No pickups defined in system

This is a non-symmetric system. If elements with power are decentered or tilted, the first order properties are probably inadequate in describing the system characteristics.

```
INFINITE CONJUGATES
    EFL      -2.4285
    BFL       1.7532
    FFL      50.0067
    FNO       0.8095
    IMG DIS   0.0000
    OAL     -12.7780
  PARAXIAL IMAGE
    HT        1.4021
    ANG      30.0000
  ENTRANCE PUPIL
    DIA       3.0000
    THI       0.0000
  EXIT PUPIL
    DIA       0.1457
    THI       1.6352
```

Two Lens User Defined Surface Table B - FIG. 7A

```
Wearable Display UDS
          RDY            THI        RMD         GLA                              CCY  THC  GLC
OBJ:   INFINITY       INFINITY                                                   100  100
  1:   INFINITY       0.000000                                                   100  100
STO:   INFINITY       32.000000                                                  100  100
  3:   30.00000      -16.000000     REFL                                         100  100

UDS:
IC :   CLO
UCO/UCC
C1 :   3.2000E+01       (Semidiameter in X (cux))
C82:   3.0000E+01       (Unused)
C83:   2.7000E+01       (Unused)
C1 :   100              C82:                  C83:
C84:   2.7000E+01       (Unused)
C84:
XDE:   0.000000         YDE:     0.000000     ZDE:    0.000000
XDC:   100              YDC:     100          ZDC:    100
ADE:   0.000000         BDE:     20.364000    CDE:    0.000000
ADC:   100              BDC:     100          CDC:    100
UMR UDS: cv_uds_wds 4:   INFINITY         -16.000000
  5:  -5.97941          -3.779162                          SLAH58_OHARA                      BEN
AAS:
KY :   0.572937         KX  :   -0.269369                  RDX:    -5.88044
KYC:   0                KXC:     0                         CCX:     0
AR :0.116038E-02        BR  :-.490039E-04                  CR :0.882559E-05                  DR :-.127122E-05
ARC:   0                BRC:     0                         CRC:     0                        DRC:     0
AP :0.110992E-01        BP  :-.160862E+00                  CP :0.436582E+00                  DP :0.292107E+00
APC:   0                BPC:     0                         CPC:     0                        DPC:     0
XDE:   0.000000         YDE:     0.000000     ZDE:    0.000000                               DAR
XDC:   100              YDC:     100          ZDC:    100                              100   100
ADE:   0.000000         BDE:     0.000000     CDE:    0.000000                                 0
ADC:   100              BDC:     100          CDC:    100
```

Two Lens User Defined Surface Table B - FIG. 7A (cont'd)

```
 6:         129.79943        -0.823472
 7:         -31.42418        -1.442745          SNPH2_OHARA
 8:           6.20140         0.000000
AAS:
KY  :  -1.343919         KX  :  -1.422041     RDX:         6.06734            0   0
KYC :          0         KXC :          0     CCX:               0            0   0
AR  :-.270463E-02        BR  :0.191276E-07    CR :0.614957E-05     DR :-.137829E-05  0 100
ARC :          0         BRC :          0     CRC:               0  DRC:            0
AP  :-.249034E-01        BP  :0.795640E+01    CP :0.252815E+00     DP :0.103389E+00
APC :          0         BPC :          0     CPC:               0  DPC:
XDE :   0.000000         YDE :   0.000000     ZDE:        0.000000  DAR
XDC :        100         YDC :        100     ZDC:             100
ADE :   0.000000         BDE :   0.000000     CDE:        0.000000            100 100
ADC :        100         BDC :        100     CDC:             100            100 100
 9:        INFINITY        -3.000000
10:        INFINITY         0.000000
XDE :   0.000000         YDE :   0.000000     ZDE:        0.000000
XDC :        100         YDC :        100     ZDC:             100              0 100
ADE :   0.000000         BDE :  13.332541     CDE:        0.000000
ADC :        100         BDC :          0     CDC:             100
> IMG:      7.32691         0.000000
YTO:
RDX:       INFINITY        CCX:        100    KC :        0.000000   IC :        YES
K  :       0.000000        KC :        100    C  :   0.000000E+00    D  :0.000000E+00
A  :-.781231E-02          B  :0.319307E-03    BC :             0    DC :         100
AC :          0           BC :          0                                      100
```

Two Lens User Defined Surface Table B - FIG. 7B.

```
SPECIFICATION DATA
    EPD       3.00000
    DIM       MM
    WL        642.73      590.86      542.02      500.48      465.61
    REF       3
    WTW       7           36          42          13          2
    INI       ORA
    XAN       0.00000     10.00000    30.00000    -10.00000   -30.00000
              0.00000     10.00000    30.00000    -10.00000   -30.00000

0.00000     10.00000    30.00000    -10.00000   -30.00000
    YAN       0.00000     0.00000     0.00000     0.00000     0.00000
              10.00000    10.00000    10.00000    10.00000    10.00000
              30.00000    30.00000    30.00000    30.00000    30.00000
    WTF       1.00000     1.00000     1.00000     1.00000     1.00000
              1.00000     1.00000     1.00000     1.00000     1.00000
              1.00000     1.00000     1.00000     1.00000     1.00000
    VUX       0.00000     0.00000     0.00000     0.00000     0.00000
              0.00000     0.00000     0.00000     0.00000     0.00000
              0.00000     0.00000     0.00000     0.00000     0.00000
    VLX       0.00000     0.00000     0.00000     0.00000     0.00000
              0.00000     0.00000     0.00000     0.00000     0.00000
              0.00000     0.00000     0.00000     0.00000     0.00000
    VUY       0.00000     0.00000     0.00000     0.00000     0.00000
              0.00000     0.00000     0.00000     0.00000     0.00000
              0.00000     0.00000     0.00000     0.00000     0.00000
    VLY       0.00000     0.00000     0.00000     0.00000     0.00000
              0.00000     0.00000     0.00000     0.00000     0.00000
              0.00000     0.00000     0.00000     0.00000     0.00000
    POL       N

APERTURE DATA/EDGE DEFINITIONS
    CA
    ELX S3                30.000000
    ELY S3                27.000000
    CIR S5                3.000000
    CIR S6                3.000000
    CIR S7                3.200000
    CIR S8                3.200000
    CIR S11               5.000000

REFRACTIVE INDICES
    GLASS CODE    642.73      590.86      542.02      500.48      465.61
    SNPH2_OHARA   1.911469    1.922072    1.935584    1.951282    1.969151
    SLAH58_OHARA  1.877667    1.882635    1.888716    1.895448    1.902692

No solves defined in system

No pickups defined in system
```

This is a non-symmetric system. If elements with power are decentered or tilted, the first order properties are probably inadequate in describing the system characteristics.

Two Lens User Defined Surface Table B - FIG. 7C

```
INFINITE CONJUGATES
    EFL         -1.3856
    BFL          0.7283
    FFL         42.0462
    FNO          0.4619
    IMG DIS      0.0000
    OAL         -9.0454
    PARAXIAL IMAGE
     HT          0.8000
    ANG         30.0000
    ENTRANCE PUPIL
     DIA         3.0000
     THI         0.0000
    EXIT PUPIL
     DIA         0.0989
     THI         0.6826
```

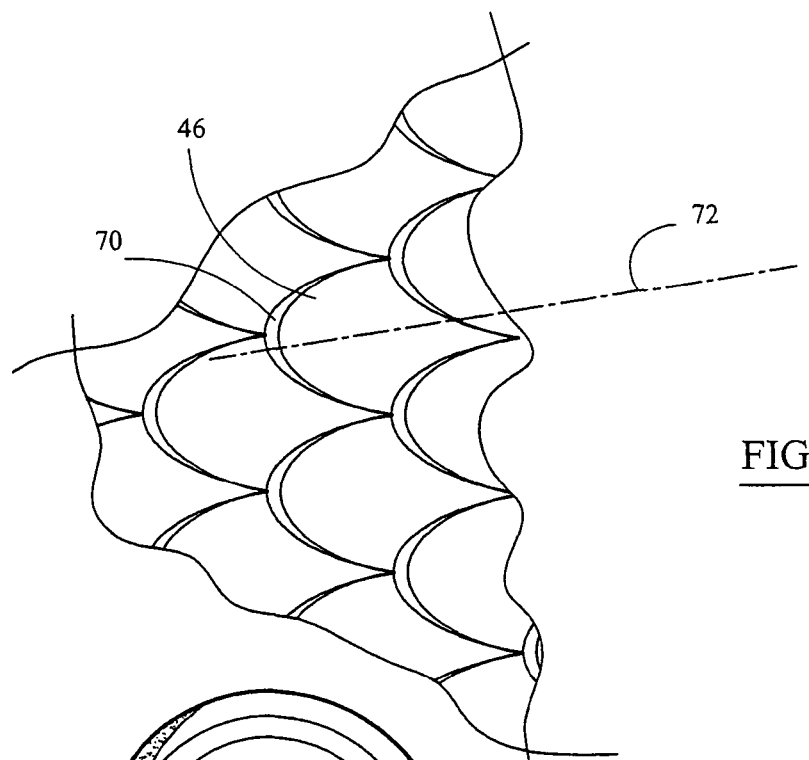
FIG.14
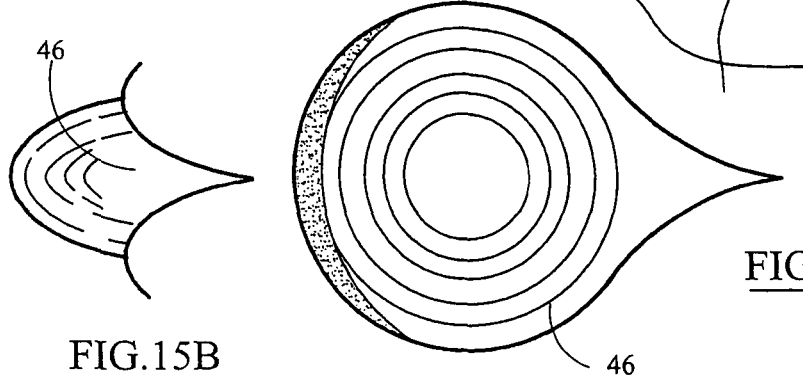
FIG.15A
FIG.15B
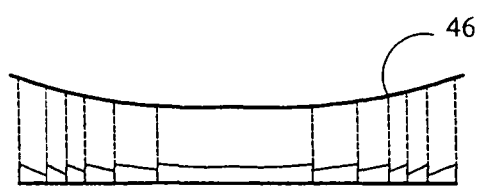
FIG.15C

FIG. 20a - UDS TABLE C

```
CODE V> list
    Wearable Display UDS
             RDY              THI      RMD        GLA             CCY   THC   GLC
 OBJ:        INFINITY         INFINITY                            100   100
 STO:        INFINITY         0.000000                            100   100
   2:        INFINITY        38.400000                            100   100
     XDE:    0.000000    YDE:    0.000000    ZDE:    0.000000
     XDC:         100    YDC:         100    ZDC:         100
     ADE:    0.000000    BDE:   13.600000    CDE:    0.000000
     ADC:         100    BDC:         100    CDC:         100

3:        36.00000       -19.200000    REFL                    100   100
     UDS:
     IC  :   CLO
     UCO/UCC
     C1  :   3.8400E+01    (Semidiameter in X (cux))
     C82:    3.8390E+01    (Unused)
     C83:    3.5900E+01    (Unused)
     C1  :         100    C82:                 C83:
     C84:    3.6000E+01    (Unused)
     C84:
     XDE:    0.000000    YDE:    0.000000    ZDE:    0.000000    BEN
     XDC:         100    YDC:         100    ZDC:         100
     ADE:    0.000000    BDE:   20.364000    CDE:    0.000000
     ADC:         100    BDC:         100    CDC:         100
     UMR UDS: cv_uds_wds 4:        INFINITY       -16.342360                            100   100
   5:        -3.98168        -4.438939    SLAH79_OHARA            100   100
     AAS:
     KY  :   0.007129    KX  :   0.020970    RDX:    -3.92871
     KYC:         100    KXC:         100    CCX:         100
     AR  :0.480879E-03   BR  :0.229154E-03   CR  :-.227849E-04    DR  :0.271034E-05
     ARC:         100    BRC:         100    CRC:         100    DRC:         100
     AP  :0.196577E-01   BP  :0.311337E-01   CP  :0.194329E-01    DP  :0.236150E-02
     APC:         100    BPC:         100    CPC:         100    DPC:         100
     XDE:    0.000000    YDE:    0.000000    ZDE:    0.000000
     XDC:         100    YDC:         100    ZDC:         100
     ADE:    0.000000    BDE:  -15.000700    CDE:    0.000000
     ADC:         100    BDC:         100    CDC:         100

6:         4.86824        -3.561200    'PMMAO'                 100   100
     AAS:
     KY  :   0.001005    KX  :  -0.000647    RDX:     5.67533
     KYC:         100    KXC:         100    CCX:         100
     AR  :-.372741E-02   BR  :-.425734E-02   CR  :-.522755E-03    DR  :0.128759E-03
     ARC:         100    BRC:         100    CRC:         100    DRC:         100
     AP  :-.867301E-02   BP  :-.614745E-01   CP  :-.237472E-01    DP  :-.642430E-02
     APC:         100    BPC:         100    CPC:         100    DPC:         100

> IMG:        7.71938         0.000000                           100   100
     XDE:    0.000000    YDE:    0.000000    ZDE:    0.000000    DAR
     XDC:         100    YDC:         100    ZDC:         100
     ADE:    0.000000    BDE:   15.651734    CDE:    0.000000
     ADC:         100    BDC:         100    CDC:         100
```

FIG. 20b- UDS TABLE C (cont'd)

```
SPECIFICATION DATA
    EPD       3.00000
    DIM       MM
    WL        642.73      590.86      542.02      500.48      465.61
    REF       3
    WTW       7           36          42          13          2
    INI       ORA
    XAN       0.00000     10.00000    25.00000    -10.00000   -25.00000
              0.00000     10.00000    25.00000    -10.00000   -25.00000
              0.00000     10.00000    25.00000    -10.00000   -25.00000
    YAN       0.00000     0.00000     0.00000     0.00000     0.00000
              10.00000    10.00000    10.00000    10.00000    10.00000
              25.00000    25.00000    25.00000    25.00000    25.00000
    WTF       1.00000     1.00000     1.00000     1.00000     1.00000
              1.00000     1.00000     1.00000     1.00000     1.00000
              1.00000     1.00000     1.00000     1.00000     1.00000
    VUX       0.00000     0.00000     0.00000     0.00000     0.00000
              0.00000     0.00000     0.00000     0.00000     0.00000
              0.00000     0.00000     0.00000     0.00000     0.00000
    VLX       0.00000     0.00000     0.00000     0.00000     0.00000
              0.00000     0.00000     0.00000     0.00000     0.00000
              0.00000     0.00000     0.00000     0.00000     0.00000
    VUY       0.00000     0.00000     0.00000     0.00000     0.00000
              0.00000     0.00000     0.00000     0.00000     0.00000
              0.00000     0.00000     0.00000     0.00000     0.00000
    VLY       0.00000     0.00000     0.00000     0.00000     0.00000
              0.00000     0.00000     0.00000     0.00000     0.00000
              0.00000     0.00000     0.00000     0.00000     0.00000
    POL       N

APERTURE DATA/EDGE DEFINITIONS
    CA
    ELX  S3       38.300000
    ELY  S3       35.900000
    REX  S4       15.324527
    REY  S4       12.096395
    ADX  S4       10.683042
    ADY  S4       10.454920
    CIR  S5       2.433282
    ADX  S5       0.445478
    ADY  S5       0.425894
    CIR  S6       1.210803
    ADX  S6       0.319085
    ADY  S6       -0.139570

PRIVATE CATALOG
    PWL                 1013.98      852.11      706.52      656.27      643.85
    589.29    587.56
                        546.07       486.13      479.99      435.84      404.66
    365.01
    'PMMAO'             1.483115     1.484965    1.487787    1.489201    1.489603
    1.491681  1.491757
                        1.493795     1.497760    1.498258    1.502557    1.506607
    1.513613
    'P-STYRO'           1.572553     1.576196    1.581954    1.584949    1.585808
    1.590315  1.590481
```

FIG. 20c - UDS TABLE C (cont'd)

```
                    1.595010    1.604079    1.605241    1.615446    1.625341
1.643126
    'P-CARBO'       1.567248    1.570981    1.576831    1.579864    1.580734
1.585302    1.585470
                    1.590081    1.599439    1.600654    1.611519    1.622447
1.643231
    'SANO'          1.551870    1.555108    1.560119    1.562700    1.563438
1.567298    1.567440
                    1.571300    1.579000    1.579985    1.588640    1.597075
1.612490

PWL              643.90      587.60      546.10      480.00
    'PEIO'          1.651000    1.660000    1.668000    1.687000

PWL              656.30      587.60      486.10
    'PCHMAO'        1.502000    1.505000    1.511000

REFRACTIVE INDICES
    GLASS CODE                   642.73      590.86      542.02      500.48
465.61
    SLAH79_OHARA                1.994764    2.002716    2.012626    2.023818
2.036128
    'PMMAO'                     1.489640    1.491613    1.494020    1.496671
1.499510

No solves defined in system

No pickups defined in system

This is a non-symmetric system.  If elements with power are
            decentered or tilted, the first order properties are probably
            inadequate in describing the system characteristics.

INFINITE CONJUGATES
    EFL         -1.7512
    BFL         -2.5018
    FFL         50.0472
    FNO          0.3907
    IMG DIS     -3.5612
    OAL         -1.5813
    PARAXIAL IMAGE
      HT         0.5466
      ANG       25.0000
    ENTRANCE PUPIL
      DIA        3.0000
      THI        0.0000
    EXIT PUPIL
      DIA        0.0703
      THI       -2.5428
CODE V> out t
```

VIEWING SYSTEM FOR AUGMENTED REALITY HEAD MOUNTED DISPLAY WITH ROTATIONALLY SYMMETRIC ASPHERIC LENSES

This is a regular patent application claiming the benefit of priority of pending provisional patent application Ser. Nos. 60/943,638, filed Jun. 13, 2007 and 61/023,664 filed Jan. 25, 2008, the content therein being incorporated herein by reference thereto. As a cross-reference, this application is related to pending patent application Ser. No. 11/762,171 filed Jun. 13, 2007.

The present invention relates to a viewing and display system and method using lenses with rotationally symmetric aspheric surfaces permitting a projected image to be focused by the lens system and an elliptical pupil relay on a user's eye (at the pupil or in the center of the eye). This system permits augmented viewing of the ambient environment, or display of a projected image, via a head mounted system. The head mounted system may be configured as glasses, goggles, a head piece or helmet.

BACKGROUND OF THE INVENTION

Development of virtual retina display technology or VRD has been investigated by the Navy and at the Human Interface Technology Lab of University of Washington. Microvision, of Redmond, Wash., manufactures a see through heads up display that overlays computer based information over real world images permitting the operator hands free, head up access to digital information.

The use of an organic light emitting diode (OLED) or a curved silicon light emitting diode (LED or LCD, liquid crystal display) as an image projector enables the image projecting surface to be curved to match, if necessary, an adjacent surface of lens which focuses the projected image.

OBJECTS OF THE INVENTION

It is an object of the present invention to provide a method and a system which focuses a projected image, via rotationally symmetric aspheric lenses, and via an ellipsoidal pupil relay (full or partial reflection) onto the pupil of a user's eye or at the center of the eye.

It is a further object of the present invention to use two or three lens elements, adjacent the image projector (preferably an OLED or silicon light emitting diode (LED)) substantially at or on foci of the ellipsoidal pupil relay and wherein the relay is mounted via the head mount device, such that the second foci of the ellipse is the user's pupil or eye center.

It is an additional object of the present invention to provide a viewing system for an augmented reality head mounted display.

Another object of the invention places the projector and lens combination at an outboard position with respect to the user's eye, that is, a position away from the bridge of the user's nose.

It is another object of the present invention, in a different embodiment, to provide a pair of emitter units removably mounted effectively on the bridge of a user's nose, which emitters point to reflector screens configured as goggles, eye glasses or screens depending from a head piece or helmet, which reflector screens reflect the optical image transmitted by the emitter unit onto the eye of the user.

It is a further object of the present invention to provide the user in a different embodiment with magnifying contact lenses to improve the optical image size.

It is another object of the present invention in additional embodiments to provide reflective surfaces with either a flat surface, curved surface or a diffraction grating surface and wherein, in certain embodiments, these reflective surfaces are a plurality of surfaces, each surface having a discrete reflection angle.

It is a further object of the present invention to provide reflective screens in other embodiments which are semi-spherical ellipsoid reflectors which eliminate the plurality of discrete reflection surfaces.

SUMMARY OF THE INVENTION

One embodiment of the present invention is a method of viewing a projected image with a head mounted display worn by a user. The method focuses a projected image with rotationally symmetric aspheric lenses and uses an ellipsoid as a pupil relay as part of the head mounted display. The image is projected at a first foci of the ellipsoid relay through the lenses. The ellipsoid relay focuses the optically pre-processed image at a second foci of the ellipsoid wherein the second foci is at or near (i) a pupil of the user's eye, or (ii) a center of the user's eye. The rotationally symmetric aspheric lenses focus or refract the projected image through either a three or a two lens element adjacent the first foci. In one embodiment, the projected image is created by an organic light emitting diode (OLED or silicon light emitting diode (LED)) adjacent a three lens element system at an outboard position with respect to the user's eye, that is, a position away from the bridge of the user's nose. Other embodiments, discussed below, locate the image projector and focusing lens system with non-rotationally symmetric aspheric lenses at an inboard location near the bridge of the nose. The image projector and focusing lens system and the ellipsoid pupil relay are correctly positioned on the head of the user by a head mount system which may be goggles or eye glasses, or screens or shields depending from a head piece or helmet worn by the user.

In another embodiment, the viewing system for a head mount display is worn by a user and is mounted on or about the bridge of a user's nose such that image projector unit emitters are a predetermined distance away from reflector screens which direct optical images into respective ones of the user's eyes. The head mount (eye glasses, goggles, head piece or helmet) specially mounts each emitter unit, left and right for the left and right eyes respectively, a predetermined distance away from a corresponding reflector screen. Each emitter unit is coupled to an image generator via a signal line. An optical image is emitted or projected from the emitter unit. In one embodiment, the emitter unit has a plurality of emitters configured in a semi or hemispherical manner to emit an optical image substantially radially towards the corresponding reflector screen. In one embodiment, each reflector screen is a semi or hemispherical reflector with a plurality of discrete reflection surfaces. Each discrete reflection surface reflects a portion of the optical image at a discrete angle such that the optical image from the emitter unit is directed into the user's eye. In another embodiment, the reflector screen is an ellipse and the reflection surface need not have discrete reflection surfaces or facets since the ellipsoid reflector is positioned such that one foci of the ellipse is at the radial center point of the emitters and the other foci of the ellipse is at either the cornea of the eye or at the optical center of the eye.

BRIEF DESCRIPTION OF THE DRAWINGS

Further objects and advantages of the present invention can be found in the detailed description of the preferred embodiments when taken in conjunction with the accompanying drawings in which:

FIGS. 5A, 5B and 5C show Table A—the User Defined Surfaces ("UDS") for the three lens focal system;

FIGS. 7A, 7B and 7C show Table B—the User Defined Surfaces ("UDS") for the two lens focal system;

FIG. 14 diagrammatically illustrates one configuration for the discrete reflector surfaces on the reflector screen;

FIGS. 15A, 15B and 15C diagrammatically illustrate shallow concave reflection surfaces for the plurality of discrete reflection surfaces in the reflector, a different shape for those discrete reflection surfaces (tear drop shape) and a diffraction grating used for the reflection surfaces;

FIGS. 20a, 20b and 20c shows proof of concept UDS Table C for a non-rotational symmetrical aspheric lens system with a three dimensional ellipsoidal reflector or relay and a spherical image projector.

DETAILED DESCRIPTION OF THE PREFERRED EMBODIMENTS

Figure 1A:
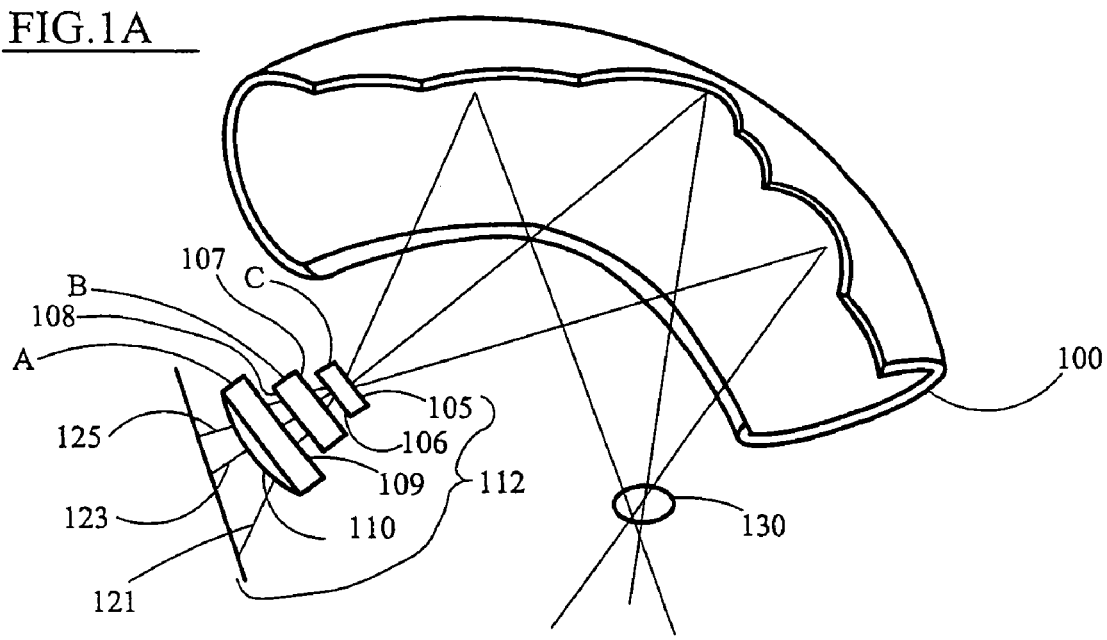
FIG. 1A diagrammatically illustrates the method and the system wherein the image projector and focus lens unit is outboard of the user's eye, at the first foci of the ellipsoid, and the user's pupil or eye center is at the second foci of the elliptical reflector or relay (full or partial reflection is permitted) (FIG. 1A is a top view of the viewing system)

The present invention relates to a viewing and display system and method using rotationally symmetric aspheric lenses permitting a projected image to be focused by a three dimensional ellipsoidal pupil relay on a user's eye (at the pupil or in the center of the eye). This system permits augmented viewing of the ambient environment, or a display of a projected image, via a head mounted system. The head mounted system may be configured as glasses, goggles, a head piece or helmet. One embodiment places the projector and focusing lens unit outboard of the user's eye (FIGS. 1-5) and the other embodiment places the image projector and focusing lens unit inboard of the user's eye (FIGS. 6-19). However, there are several variations of each embodiment and some variations may be employed with the outboard or peripheral embodiment but those variations are discussed in connection with the inboard embodiment. In a similar fashion, variations of the outboard embodiment may be implemented in the inboard embodiment. The claims appended hereto are meant to cover these variations as specified in the claims themselves. In the most general sense, the present invention relates to a viewing system and a method for head mounted display worn by a user wherein the image projector and focusing lens system is mounted either on and about the bridge of a user's nose (FIG. 8) or outboard of the user's eye (FIG. 3) with a pupil relay or reflector screens for each eye mounted on the user's head via glasses or head mount helmet or cap. Similar numerals designate similar items through the drawings.

FIGS. 1-5 show a design of the viewing system wherein the image projector and focusing lens system 112 (projector-lens unit 112) is peripherally mounted on the head of a user at a position near the outboard or outside of the eye. A complete viewing system would include two projector-lens units 112, each mounted on the glasses, goggles, helmet or head mount, at a position outside or outboard of the user's eyes. See FIG. 3, projector 140, lenses A, B and C, comprising projector-lens unit 150. In contrast, the viewing system shown in FIGS. 6-19 shows a viewing system wherein the emitter (a projector-lens unit) is inboard or on or near the bridge of the user's nose. In both viewer systems, the emitter or projector-lens unit directs light to a reflector screen or a relay, which light then is directed into the eye of the user. A single viewing system may be employed for one eye. The reflector screen or relay is also mounted on the head mount or helmet or forms part of the user's glasses or goggles. The focal point of the emitted light rays are directed at the user's eye and the precise focal point may be on the eye surface (at the user's pupil) or at the midpoint or center of the eye by the three dimensional ellipsoidal surface. This focal point distinction is discussed later with respect to FIG. 10. Similar numerals refer to similar items throughout all of the drawings.

When the image projector and lens system 112 or 150 (FIGS. 1A and 5) is mounted on the outboard position relative to the user's eye, the system employs three (3) optical lens elements to focus the image with rotational symmetric aspherical surfaces.

The outboard emitter system includes an OLED (organic light emitting diode) or a curved silicon light emitting diode (LED) image projector, which is almost flat in shape. FIG. 6C shows the x-y flat and x-y curved surface combinations for the image projector of the outboard or peripheral projection system. FIG. 6C, shape 1 is flat in both the x and the y direction, that is, laterally and longitudinally over the surface of the image projector. The z axis is normal to the plane formed by the x-y axises. FIG. 6C, shape 2 is a cylinder with an r radius in the y axis. FIG. 6C, shape 3 is an ellipsoid with radii r1 and r2 in the y and x axises. FIG. 6C, shape 4 is Y Toroidal with a radius r in the x axis. The Code V Reference Manual, Vol. 1, p. 4-75, October, 2006 by Optical Research Associates, discusses Y Toroidal shapes known to persons of ordinary skill in the art. FIG. 6C, shape 5 is a biconic shape projector emitter surface and FIG. 6C, shape 6 is another Y Toroidal shape. Other projectors may be used. UDS Tables A and B relate to flat or almost flat projector emitter surfaces. FIG. 1A shows lens A, lens B and lens C which are mounted together at an outboard position on the user's head relative to the user's left eye. The position of the OLED or silicon light emitting diode (LED) projector surface in the projector-lens unit is at or substantially at the first foci of the elliptical pupil relay 100. The lenses are mounted atop or adjacent the image projector. The image projector is not shown in FIG. 1A but is diagrammatically shown in FIG. 3 as image projector 140. Rays 121, 123 and 125 are graphic depictions of hypothetical light transmission paths but, in fact, the projector-emitter surface is mounted to or spaced from the back side 110 of lens A and no light transmission path exists beyond the projector-emitter surface.

FIGS. 5A-5C, Table A lists User Defined Surfaces ("UDS") which define the parameters of lenses A, B, and C as well as the emitter surface shape of the image projector and the shape of the elliptical pupil relay 100. Lens manufacturers and optical technicians understand the UDS parameters listed in Table A. The image or "img" UDS data in Table A relates to the surface of the image emitter (data "img"). Lens A is mounted adjacent the image projector surface. UDS Tables A and B list air gap or fill gap spaces between the optical elements. Lens A has surfaces 110 and 109 defined as UDS items 10 and 9 (Table A). The UDS defined surface 10 (see lens surface 110, FIG. 1A) is mounted adjacent to the image projector emitter surface and UDS defined surface 9 (lens surface 109) is the light exit surface. Intermediate lens B has an inboard surface UDS 8 (lens surface 108 adjacent lens surface 109 and generally closer to the emitter surface) and an outer lens surface 107 farther away from the emitter surface. Lens surface 107 defined as UDS 7. The inboard surface 106 of lens C is UDS shape 6 and the outermost lens surface 105 of the emitter-lens combination is defined at UDS 5. The reflector-relay elliptical surface is defined by Table A as UDS surfaces C1 and C83, numerically identified as 3.840 and 3.59. It should be noted that the term "surface" used herein does not refer to a structure exposed to the ambient environment but rather a material boundary. The surface may be adjacent or spaced from another surface. Further, in practice, the lenses are mounted in spaced relationship to each other as set forth in the UDS data in FIGS. 5A, B and C and 7A, B and C. The illustrations herein show the lenses separated by air gaps such that the lenses are either fixed in such positions or the gap is filled by neutral optical material. Alternately, the lenses are mounted atop each other with the use of pmma or polymethyl-methacrylate as a gap filler (or other gap filler which does not effect the optical system as described). Poly (methyl methacrylate) (PMMA) is used in conjunction with the glass element for two purposes. First it provides compensating dispersion for color correction of the lens. Second, it is injected into the assembly to provide fastening and stabilization between the glass element and the source, either LCD or OLED. Typically, an air gap exists between the projector-lens units and another air gap exists between the pupil relay and the eye. Other lens combinations (with or without intermediate gaps or fillers) may be used having the same functional output, as specific lens structures and indices defined in Table A, in order to achieve the functional equivalent of the present optical processing invention. The lenses A, B and C have various indices of refraction and are made of certain materials shown in Table A and as defined in the UDS parameters as the "refractive indices."

Figure 1B:
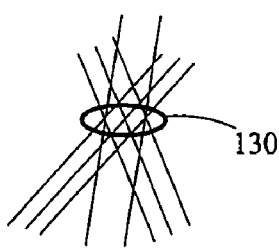
FIG. 1B diagrammatically illustrates the focal point on or in the user's eye for the viewing system.
Figure 2:
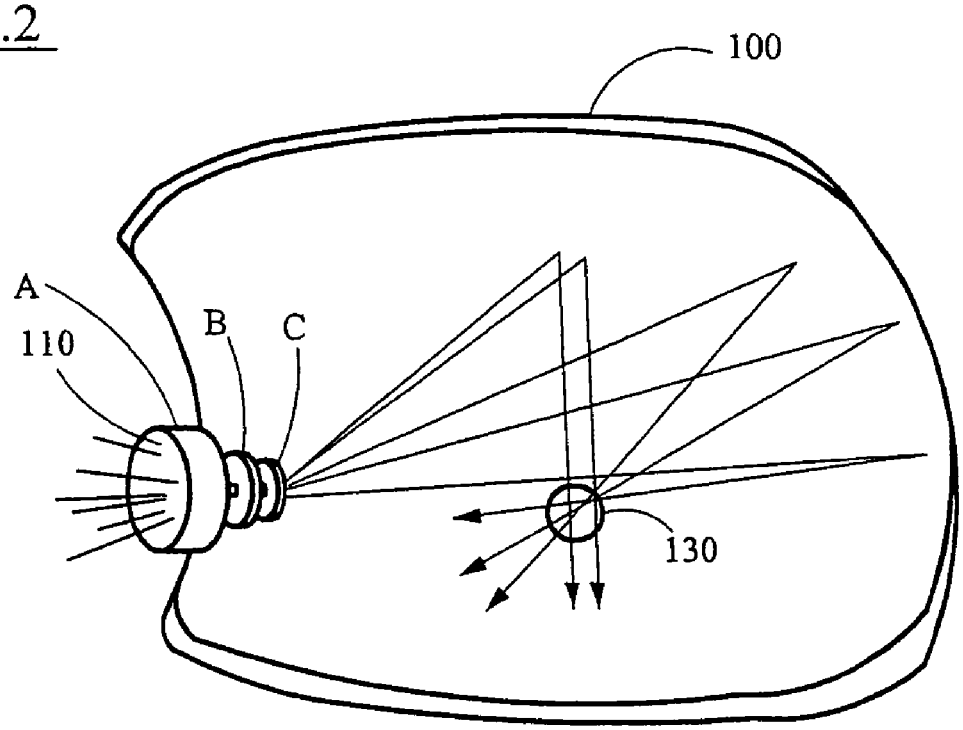
FIG. 2 diagrammatically illustrates a side view of the method and the system wherein the image projector and focus lens unit is outboard of the user's eye.

An image projected through lens system A, B, C and reflected off ellipsoid pupil relay 100 is focused either at the user's pupil or at the user's eye center at focal region 130. FIG. 1B shows the convergence of the light transmission paths at focal region 130. The rays emitted from the lens systems described herein are collimated by the relay producing an image that appears at infinity. See collimated rays at area 130 in FIG. 1B. See also, FIG. 6A and the post-relay ray pattern. FIG. 2 is a side view of the system and diagrammatically shows the projector-lens unit, the pupil relay 100 and the focal point 130 at the second foci of the elliptical relay.

Figure 3:
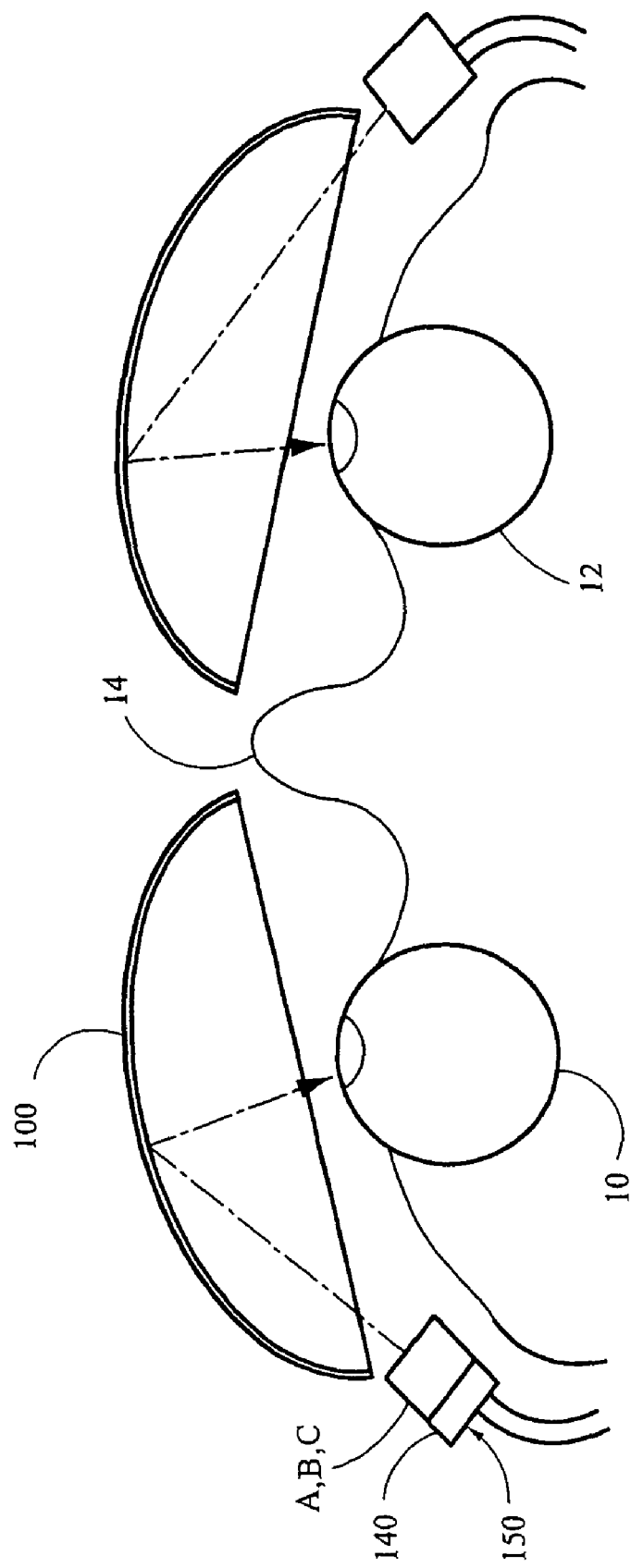
FIG. 3 diagrammatically illustrates the outboard position of the image projector and focus lens unit, the user's nose and diagrammatically illustrates the ellipsoidal pupil relay.

FIG. 3 shows that the emitter-lens unit 150 is on the left, outboard side of the user's left eye. The light from the emitter-lens unit 150 is reflected off the reflector-relay screen 100 (with the UDS characteristics as listed in Table A) and into the user's left eye 10. The focal point 130 is either on the pupil or in the center of the eye. Another emitter-lens unit 150 is on the right projecting an optically processed image into the right eye 12 via the right-side elliptical relay 100. A single view system for one eye may be used. Due to the collimation, the user sees projected images at infinity.

Figure 4:
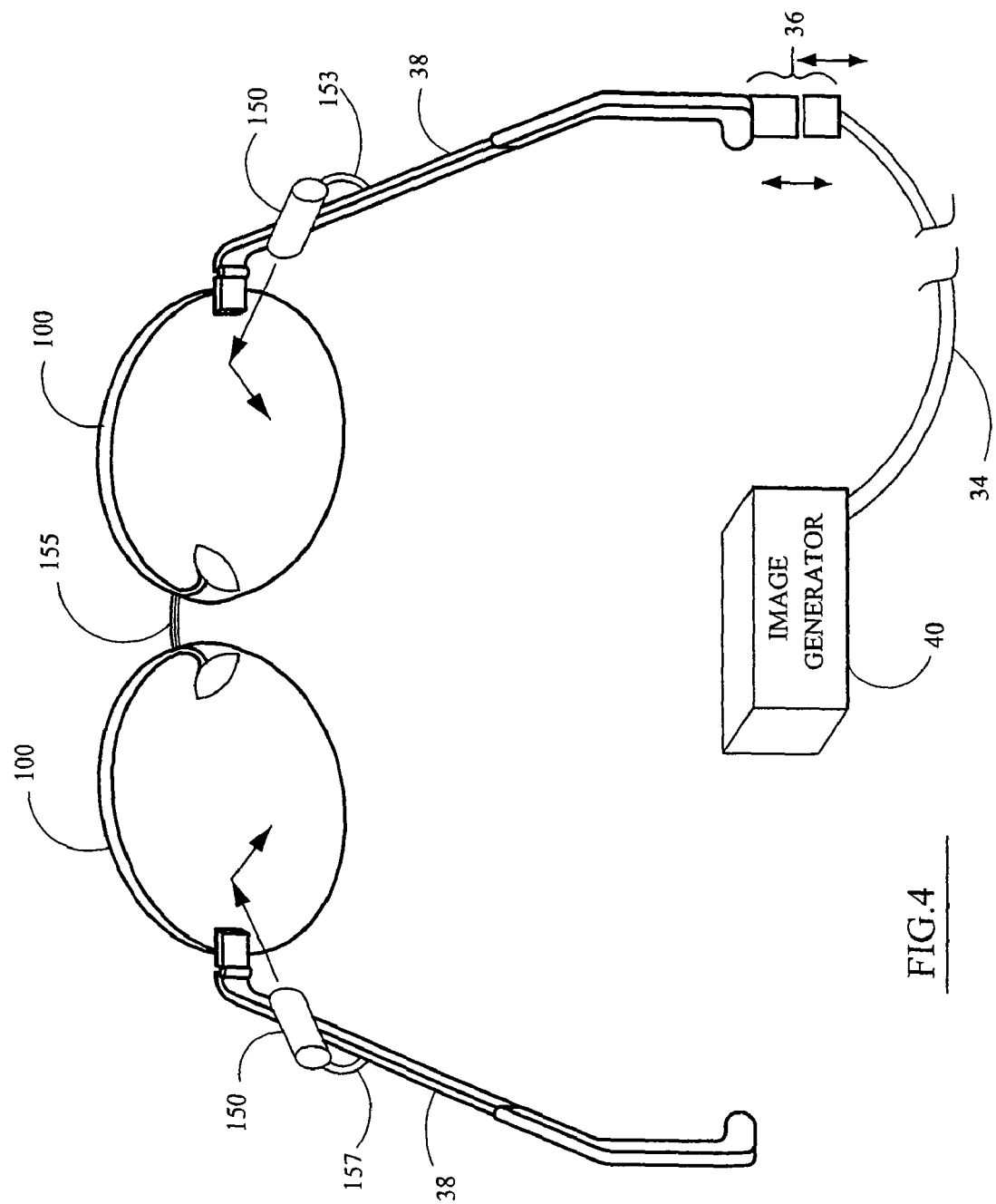
FIG. 4 diagrammatically illustrates the other major components of the outboard viewing system.

FIG. 4 shows elliptical relays 100 transferring the optically processed image from projector-lens units 150 into or onto the user's eyes. The relays in this embodiment are configured as glasses and the units 150 are mounted on frame arms 38. Wires 34, 38, 153, 155 and 157 carry image signals to the image projectors 140 which are part of the units 150. Wires may be replaced by optic cables. Coupler 36 permits the signal transmission system 34, 38, 153, 155 and 157 to be connected or disconnected from image generator 40.

Alternatively, a flat image projector surface may be used rather than the slightly curved image projector surface "img" listed in UDS Table A. Studies have shown that the flat image projector surface (the OLED projector or silicon light emitting diode (LED)) with the same three lens elements discussed above produces an image on the eye which is not as clear as the slightly curved projector emitter surface. FIG. 6C shows the x-y flat and x-y curved surface combinations for shape 1—flat; shape 2—cylinder; shape 3—ellipsoid; shape 4—Y Toroidal; shape 5—biconic; and shape 6—Y Toroidal shape. The outboard emitter-projector lens systems seem to perform better than the inboard systems.

Figure 6A:
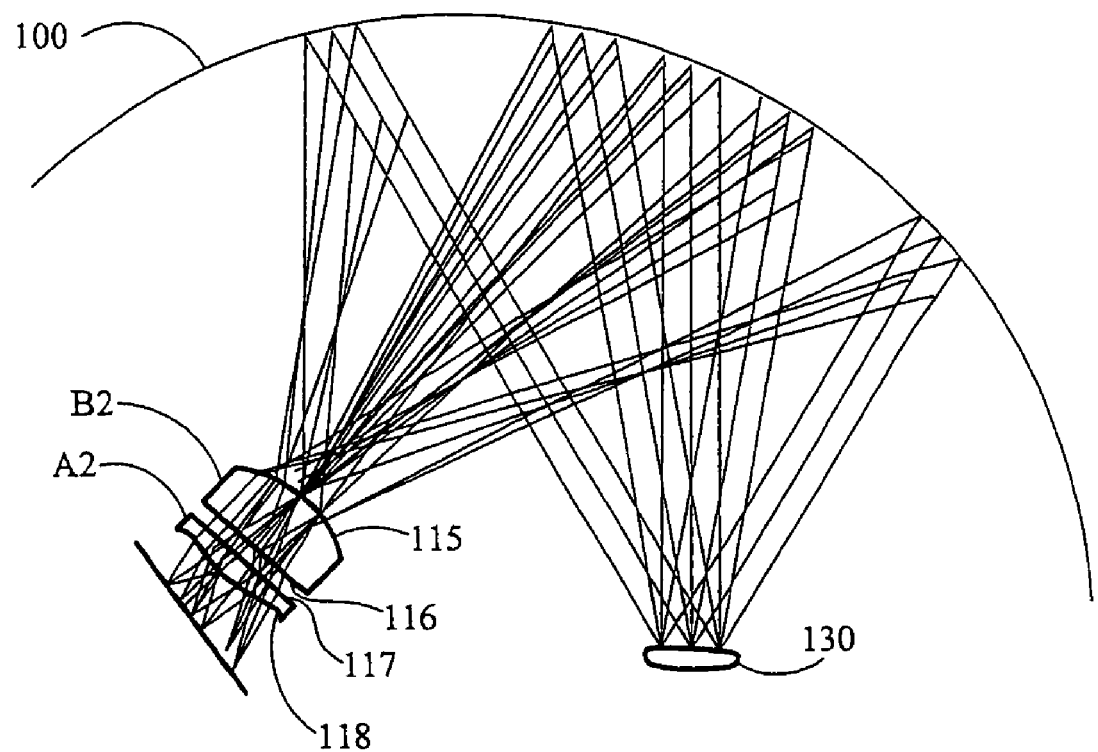
FIGS. 6A and 6B diagrammatically illustrate a focal system with a two lens focal system defining two non-rotationally symmetric aspheric surfaces with the use of an ellipsoid as a pupil relay (FIG. 6A is a top view and FIG. 6B is a detail of the curved image projector and two lens system)

FIGS. 6A. 6B and 7A, 7B and 7C illustrate and describe a different embodiment of the invention wherein the emitter-lens projectors are inboard on or near the nose bridge with non-rotationally symmetric aspheric lenses. In this embodiment, the emitter-lens units are mounted near or on the user's nose bridge. See FIGS. 8, 9A and 10. Further details of the inboard system are discussed later in connection with FIGS. 8-19. The inboard systems use a non-rotational symmetric aspheric lenses.

With the projector-lens units at an inboard position, UDS Table B in FIGS. 7A-7C defines the biconical shape of image projection surface as "img" in the UDS Table B. FIG. 6C shows various shapes of the image projecting surface for the two lens system. The next or adjacent lens A2, attached atop the image projector surface (not shown in FIG. 6A), has a lens surface A2-118 and is defined at Table B—UDS 8 surface. The outboard lens surface A2-117 of the first lens A2 has UDS shape listed at UDS element 7 in Table B. The outermost lens B2 has an inboard surface B2-116 defined as UDS element 6 shape. The outermost surface B2-115 of the outermost lens B2 has a surface defined as UDS element 5. The lenses A2 and B2 in FIG. 6A have an index of refraction and a material shown in the UDS Table B as the "refractive indices." The focal point 130 and elliptical relay 100 are also shown in FIG. 6A. Gaps are listed in the UDS Table B and may be air gaps.

Figure 6B:
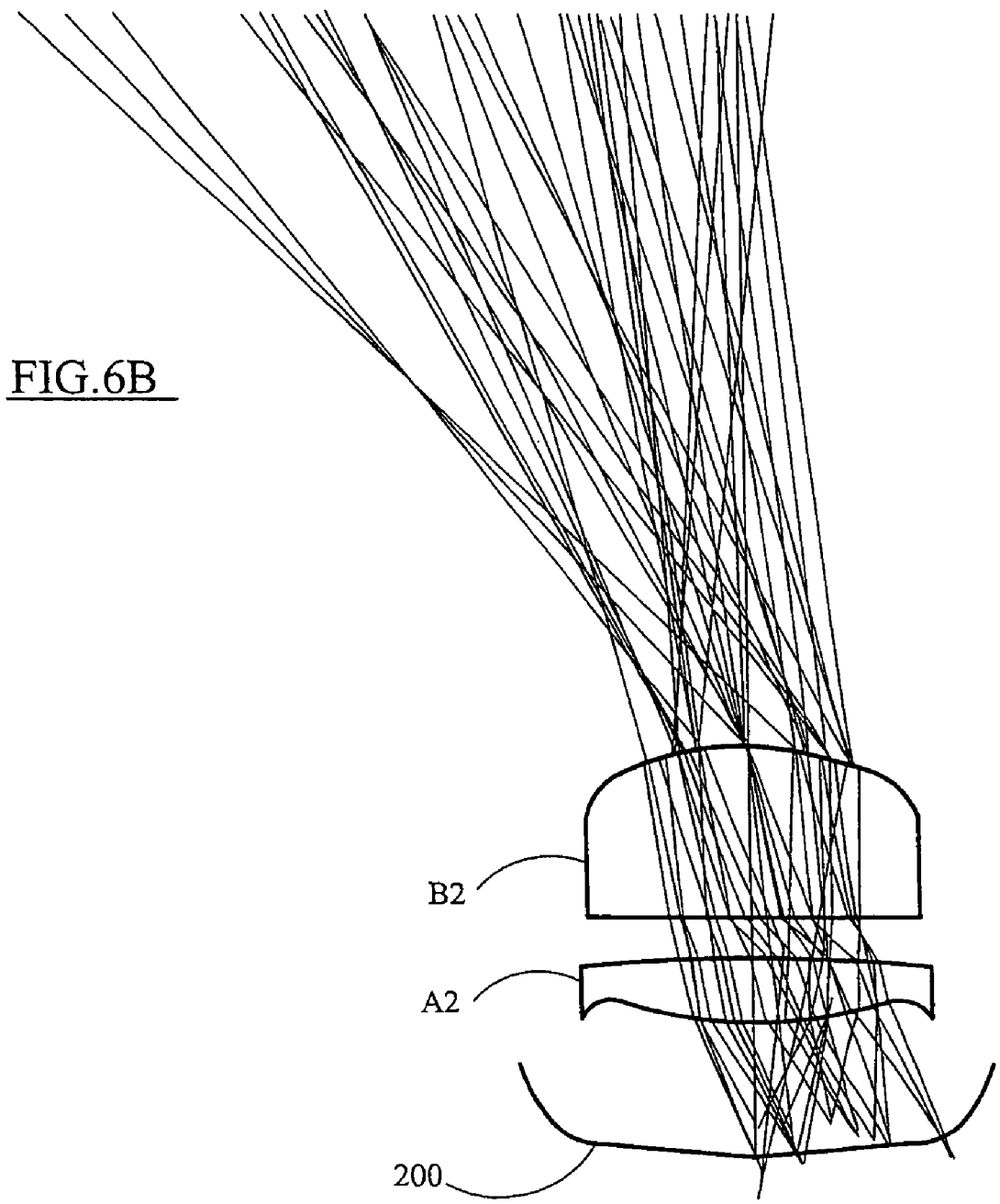
Figure 6C:
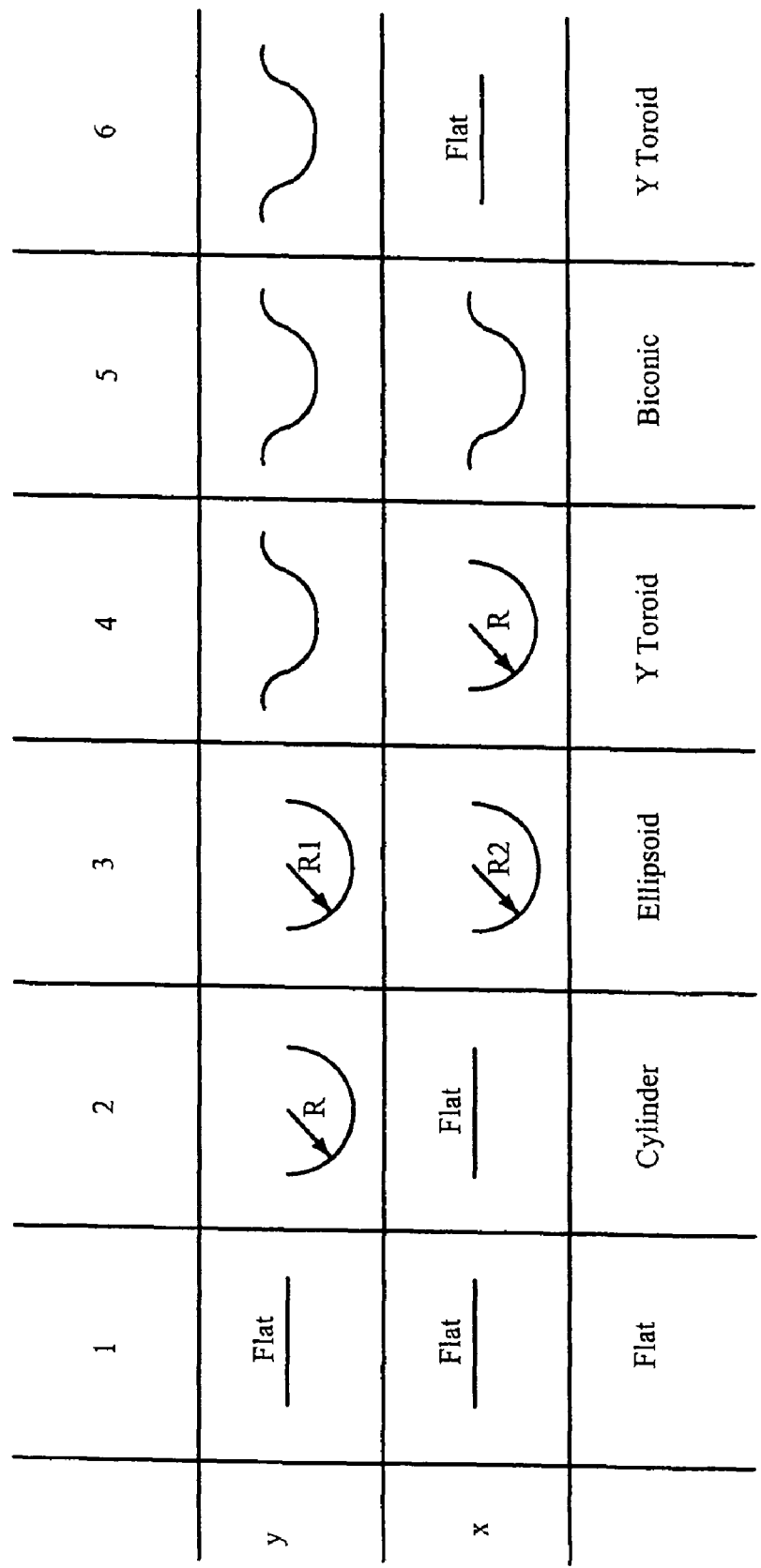
FIG. 6C and shapes 1-6 therein diagrammatically illustrate shapes of the image projector surface.

The embodiment in FIGS. 6A, 6B and 7A-7C uses an ellipsoid as a reflector-relay surface 100. The focal point 130 is the foci of the ellipsoid wherein the image is focused on the top of the user's eye or in the center of the user's eye. The first foci of the ellipsoidal relay 100 is substantially at the image projector surface and the second foci of the ellipsoidal relay 100 is on or in the eye. The "eye" foci is shown to the right of the emitter-lens combination in FIG. 6A. The other foci of the relay is a projection surface in the emitter-lens system. FIG. 6B shows the biconic nature of the image projector surface 200 and the general shape of lenses A2 and B2 (which in practice would be mounted on or spaced from the image projector surface) and the short range light transmission paths. This embodiment uses a curved or biconical surface for the image projector surface. See FIG. 6C. The OLED or LED may be configured to match these curves. A high density glass is used for more refractive power for lenses A2 and B2. High density glass has a refractive index of 1.7-2.0. The emitter surface of the OLED or silicon light emitting diode (LED) may also be configured as a monoconic surface.

Figure 8:
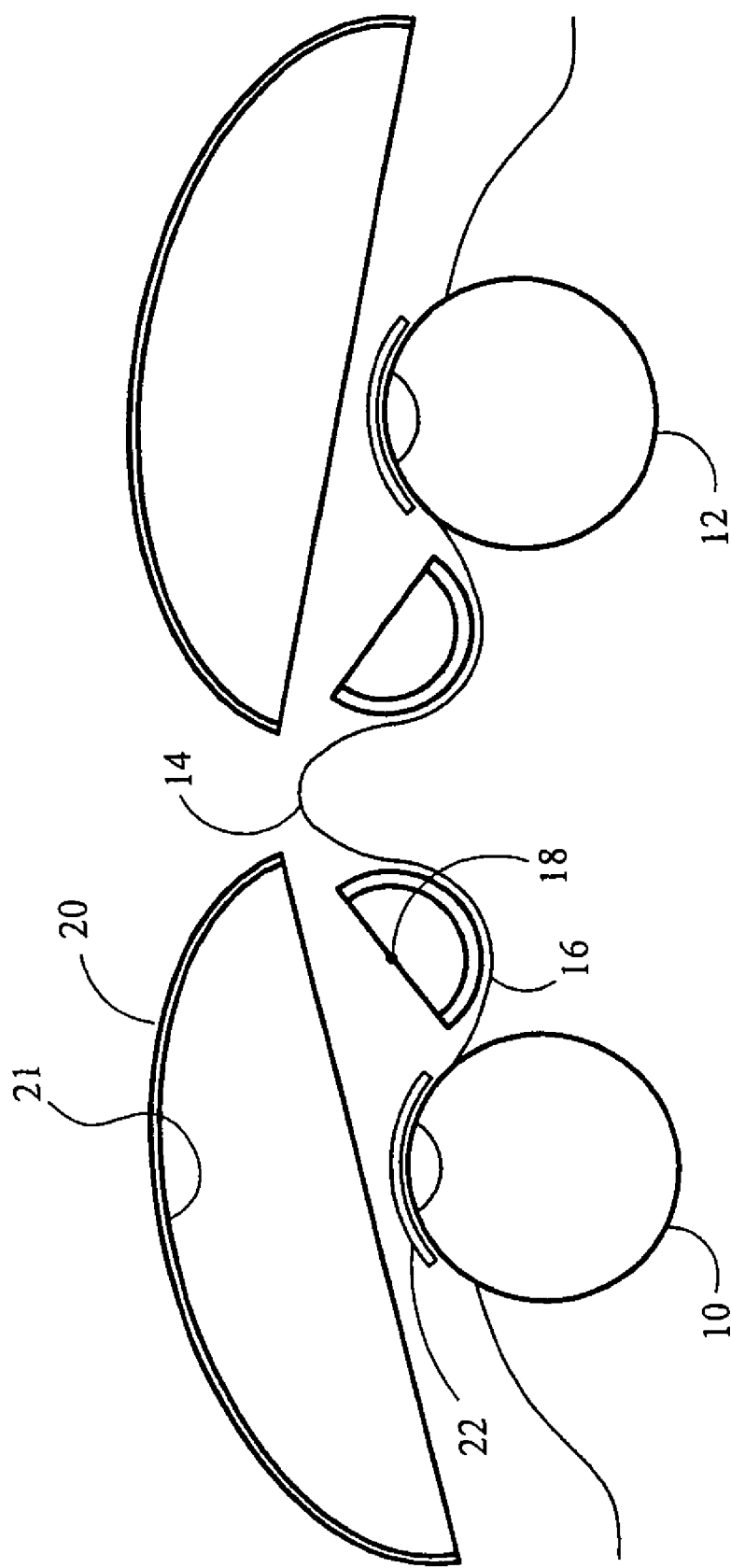
FIG. 8 diagrammatically illustrates another embodiment of the invention wherein the image projector or emitters (plus the focusing lens systems) are inboard the user's eyes and the projected image is further focused by reflector screens.

FIG. 8 diagrammatically illustrates a user's left eye 10 and right eye 12 as well as the nose bridge 14 of the user. FIG. 8 diagrammatically illustrates the viewing system which includes a pair of emitter units which are mounted on or about the bridge of nose 14 and a pair of reflector screens, each screen corresponding to a certain emitter unit. Similar numerals designate similar items throughout the drawings. Only one emitter-reflector screen system is described in detail. Persons of ordinary skills in the art recognize that the opposite side emitter-reflector system is substantially similar.

In FIG. 8, a semi or hemispherical emitter unit 16 is mounted on or near the bridge of nose 14. Emitter unit 16 has a plurality of emitters therein which effectively generate an optical image through center point 18. This optical image is projected substantially radially onto a specially configured reflector screen 20. Due to the reflection of the inboard side 21 of reflector screen 20, the optical image is then directed or reflected into user eye 10. In order to magnify the image, the user may employ magnifying contacts 22.

Figure 9:
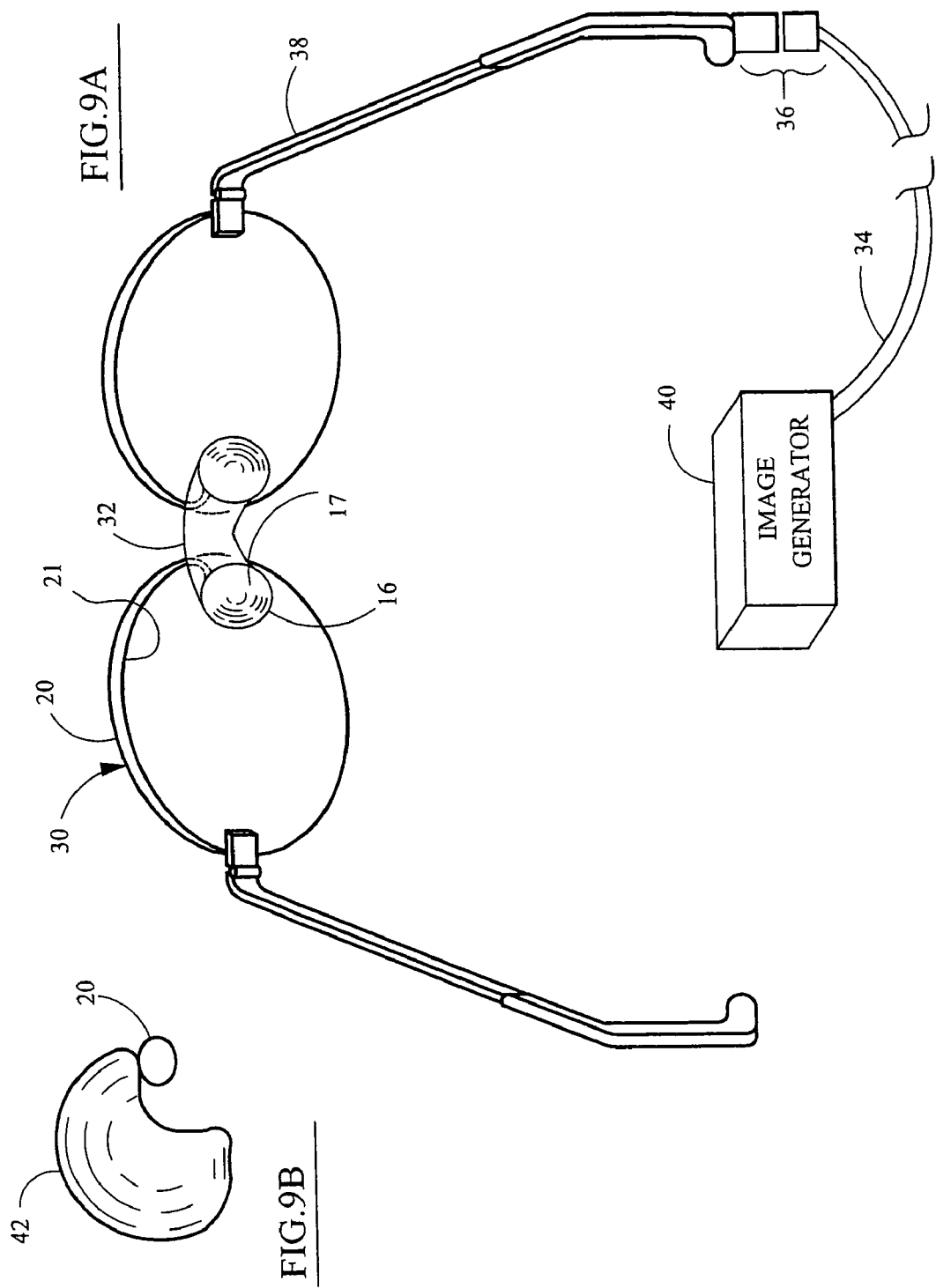
FIGS. 9A and 9B diagrammatically illustrate the reflector screens and emitter units mounted on glasses or goggles and diagrammatically illustrate a helmet or head piece with depending reflector screens (eye shields)

FIG. 9 shows spectacles (eye glasses) or goggles 30 and the back side 17 of emitter unit 16. A goggle nose bridge 32 is adopted to rest on nose bridge 14 of the user. Emitter backside 17 may also rest on the user's nose. The inboard reflective surface 21 of reflector screen 20 is shown. In order to transfer signals representing the optical image to the pair of emitter units 16, goggle or spectacle 30 includes, in the illustrated embodiment, signal line 34. A removable coupling 36 permits the user to attach and detach signal line 34 to the glasses or helmet. Of course, further portions of signal line 34 extend through arm 38 (or the helmet) to both emitter units 16. An image generator 40 generates an image which is applied to signal line 34. In one embodiment, an optical image is generated by image generator 40 and this optical image is carried by fiber optics in signal line 34. Alternatively, the emitter units 16 may be electronic light generators such as LEDs or other light emitting elements and electronic signals could be carried by signal line 34. In this situation, image generator 40 generates electronic signals which correspond to the image.

FIG. 9B shows a head piece or helmet 42 which is mounted on the head of the user such that the optical image from emitter units 16 is projected to a depending reflector screen 20 and then redirected to the eye of the user. The left and right screens drop below the front edge of the helmet and may act as eye shields. The emitters also depend from the helmet and rest on or near the user's nose bridge. Optical fibers in signal line 34 may reduce electrical noise and unwanted radiation which may be generated by electrical light emitters 16.

Figure 10:
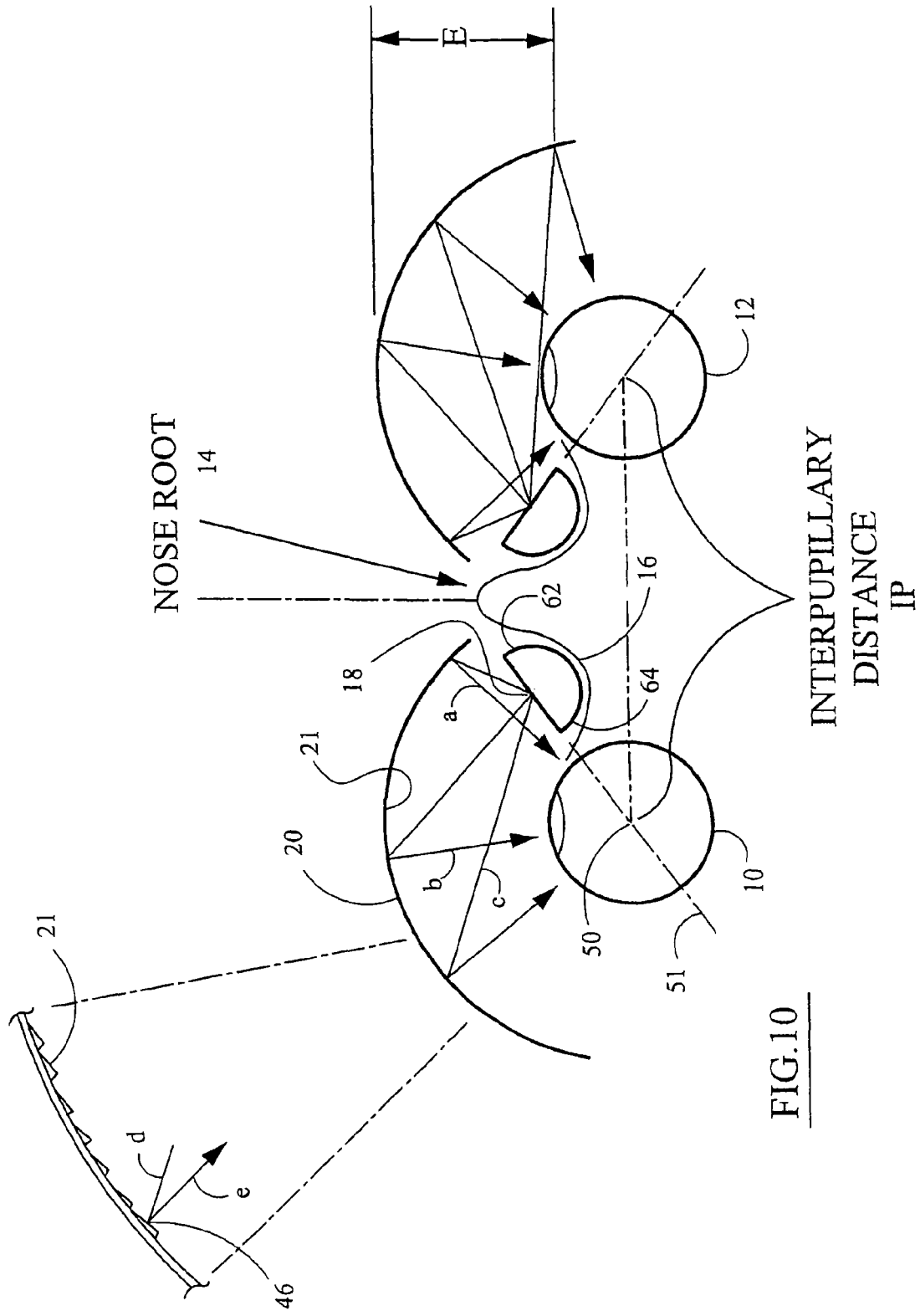
FIG. 10 diagrammatically illustrates one optical operation of the system.

FIG. 10 shows that radial light rays leave light emitter unit 16 and are reflected back to the eye by the reflector screen, that is, rays a, b, and c are optically processed at the end of the emitters and are reflected back into eye 10. The inboard surface 21 of reflector screen 20 includes a plurality of discrete reflection surfaces each having a discrete angle to direct the optical image from the emitter unit into the user's eye. These discrete reflection surfaces may be made by curved monolithic silicon structures described in "For a Cheaper Camera," Technology World, May, 2008, by H. Hogan. The discrete reflection surfaces are made reflective or diffractive. Therefore, in the expanded view in the upper left of FIG. 10, inboard surface 21 has a plurality of discrete reflection surfaces, one of which is surface 46, wherein optical image ray d strikes discrete reflective surface 46 and the angle of incidence and the angle of reflectance results in ray e being directed into the eye 10 of the user. FIG. 10 shows that the pair of emitter units 16 are placed a predetermined distance from the user's eye (distance from the centerline of the nose) when taking into account the distance between radial center point 18 of emitter 16 and the reflection of the light towards eye 10. In this embodiment, eye 10 has an optical center point 50 that falls on line 51 defined by the forward edge of semi or hemispherical emitter unit 16. Calculations indicate that there is a reasonable common interpupillary distance or IP for most users. Further, the distance from the user's cornea or the contact lens on the cornea to the hemispheric reflective surface, that is, along the optical centerline of the eye—reflective surface combination, is fixed. It has been observed that line 51 identifies the typical maximum angle of rotative movement of eye 10. Therefore, the user either would not see emitter unit 16 on his or her nose bridge or would only see a very small portion thereof. In one embodiment, emitter 16 has light transmitters of the same size. In another embodiment, the size of the emitter surfaces varies.

Figure 11:
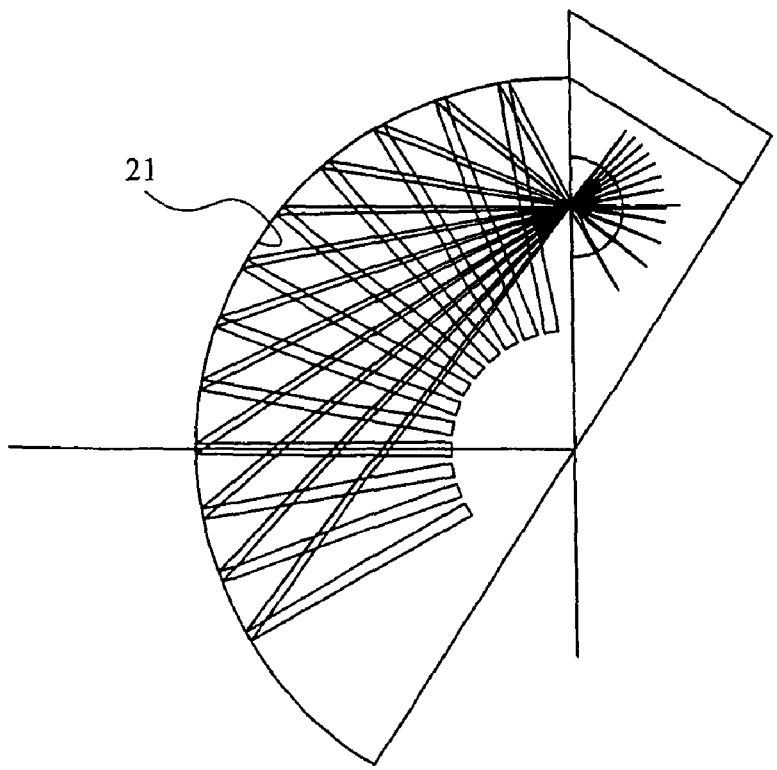
FIG. 11 diagrammatically illustrates one technique for focusing collimated light.

FIG. 11 diagrammatically shows that collimated light, when reflected from reflective surface 21, can be directed to a singular point. That singular point is preferably at or immediately below the cornea of the user's eye. In one embodiment, it is believed that the semi or hemispherical emitter 16 must have a plurality of emitter units having different sizes. In another embodiment, the emitters have the same size or radii generating the optical image. For improved fill factor circle pack individual emitter surfaces using an interstice (3) pattern.

FIG. 11 also shows that a spherical emitter-projector, with an associated lens system (a non-rotational symmetrical aspheric lens system established by the proof of concept Table C) develops collimated image rays to the eye. The lens system, as noted in the proof of concept UDS Table C, FIGS. 20a, 20b and 20c, is a non-rotational symmetrical aspheric lens system with a three dimensional ellipsoidal reflector or relay which uses pmma (see pmmao in Table C near the refractive indices chart).

Figure 12:
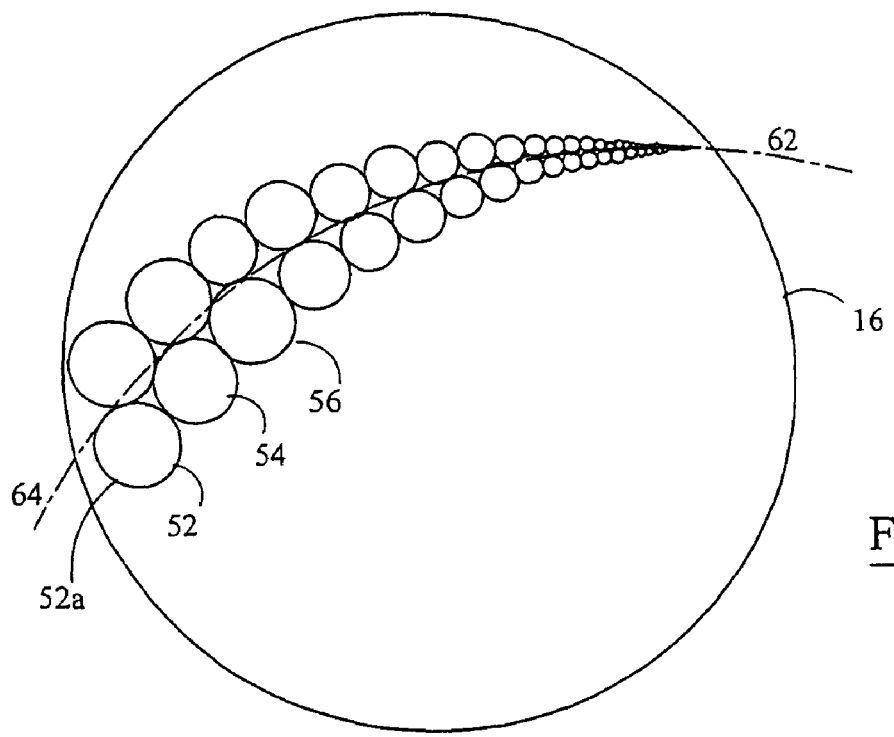
FIG. 12 diagrammatically illustrates the plurality of emitter units on the semi or hemispherical emitter unit.

FIG. 12 shows emitter 16 having a plurality of discrete emitters 52, 54, 56 that have a progressively smaller size along an arc from the inboard edge of the semi or hemispherical emitter body near the eyeball to the outer hemispherical edge distal from the eye. The size change of the emitter surfaces, from proximal to distal positions, is shown in FIG. 12. One emitter surface is emitter surface 52a. The change in emitter radii is not a constant change in radius. Further, the semi or hemispherical emitter unit 16 itself forms a concave projector wherein the emitter surface or light projection emitting pixels (surface 52a) are smaller on outboard side 62 as compared with inboard side 64. Inboard or proximal side 64 is nearer to the eye as shown by side 64 in FIG. 10. Side 62 is outboard or distal with respect to eye 10. The different sizes of the emitters compensate for the longer distances traveled by rays c (FIG. 10) as compared to short distance rays a.

The distance from the cornea of eye 10 to the outboard edge of reflective surface 20 is approximately fixed. This is distance E in FIG. 10.

Figure 13B:
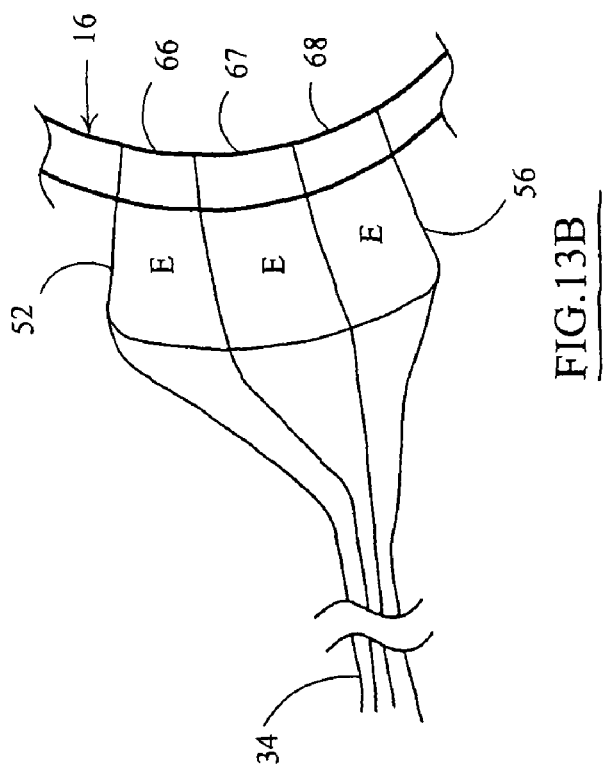
FIGS. 13A and 13B diagrammatically illustrate emitter unit and discrete reflection surfaces from the reflector.
Figure 13A:
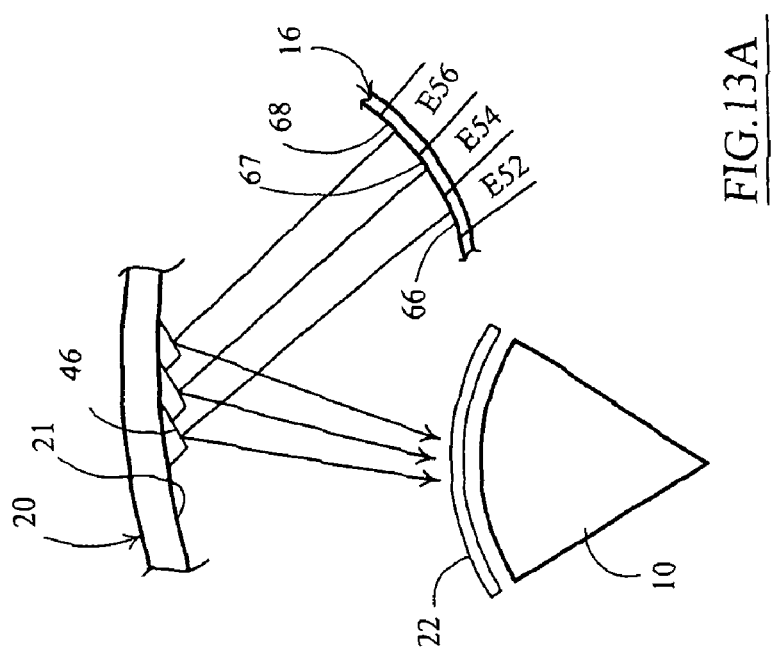
Figure 16A:
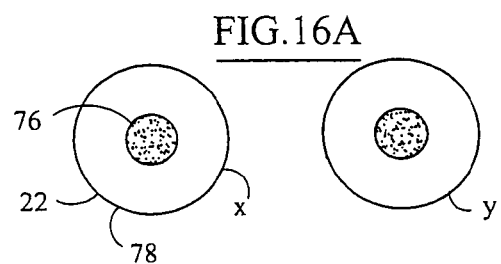
FIGS. 16A, 16B and 16C diagrammatically illustrate contacts worn by the user to magnify the image projected by emitters and reflected from the reflector screens.
Figure 16B:
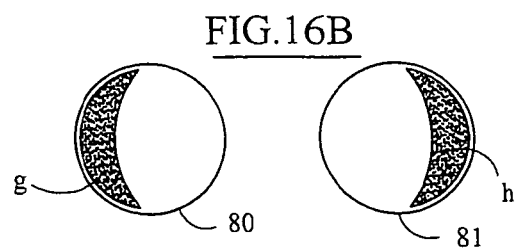
Figure 16C:
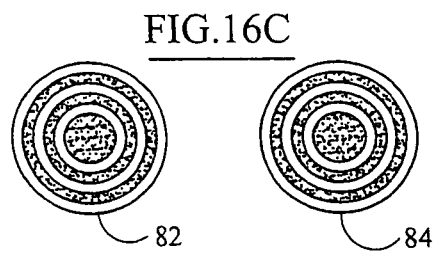

FIG. 13A shows a portion of emitter unit 16 and particularly emitters 52, 54 and 56. These emitters may have emitting surfaces tightly packed on the concave unit 16. Each emitter may have, mounted thereon, an optical lens, one of which is lens 66 on emitter 52. Faceplates may be used also (see faceplates manufactured by Schott of Germany). By having different faceplates or lenses 66, 67, 68, it may be possible to have a uniform set of emitters (same radii) on emitter unit 16 and vary the type or degree of image magnification or diffusion via lenses 66, 67, 68. Alternatively, or in addition to, lenses 66, 67, 68 may be cylinders which further collimate the light directed to reflector screen 21. It's beneficial that the light be collimated as much as possible in order to correctly optically transmit the image into eye 10.

Rather than separate lenses for each emitter-projector surface, a single lens for groups of emitter surfaces or a single lens for all emitter surfaces may be used.

FIGS. 14 and 15A-15C diagrammatically show different shapes of the reflective surfaces 46 on the reflector screen. Reflective surface or facet 46 is at an appropriate or predetermined angle such that reflective surface edge face 70 is aligned or in line with imaginary line 72 which is parallel to incoming optical rays b (FIG. 10) from emitter 16 and the reflective surface transmits the light into the eye. In this manner, most of the optical image ray b is reflected from reflection surface 46 and only a small amount of stray light is reflected or deflected due to the edge face 70.

FIG. 15A shows that reflection surface 46 may be generally circular (the overall shape in the reflector plate). Optionally, the reflective surface may be planar or may have a slightly concave shape which shape redirects and focuses light back into eye 10. FIG. 15B shows that reflective surface 46 in the reflector plate plane may be tear drop shaped. The reflective surface 46 may be concave, convex or other curved surface. The packing ratio of the reflective surfaces can be designed by a computer. FIG. 15C shows that reflective surface 46 may include a diffraction grating.

In order to magnify the optical image, each of the user's eyes may wear a contact 22. Dependent upon the optical processing of the optical image by the system as a whole, the user may or may not wear contact lenses to magnify the optical image. The use of an ellipsoid relay avoids the need of a contact lens in most situations. The contacts may be full field of view magnifiers or partial view magnification. One partial view contact with a central region 76 magnification and a clear or zero magnification in peripheral region 78 (see FIG. 16A). Another partial view magnification is lenses 80, 81 have outboard peripheral regions g, h in FIG. 16B which have a magnification plus value. The inboard regions are zero diopters. Contact lenses 82, 84 in FIG. 16C have a plurality of annular rings wherein each annular ring has the same magnification power. The preferred embodiment of an ellipsoid (FIG. 19) may use a contact with magnification in central region 76.

Figure 17:
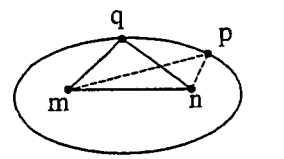
FIGS. 17, 18 and 19 diagrammatically illustrate the light reflection principles of an ellipse, one reflective surface configured as a semi-spherical ellipsoid, and a second reflective surface configured as ellipsoid.
Figure 19:
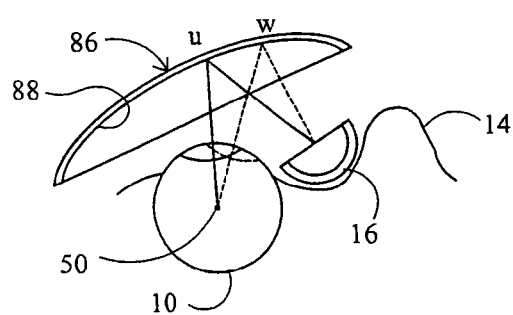
Figure 18:
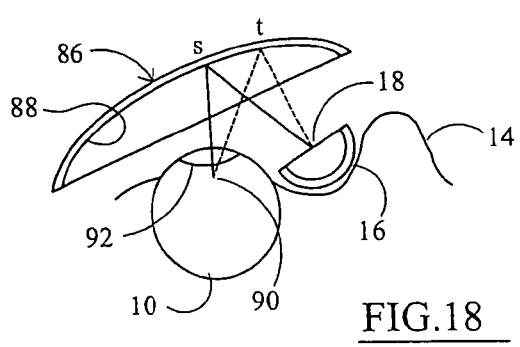

FIGS. 17, 18 and 19 diagrammatically show the optical performance of a semi or spherical ellipsoid as a reflective screen. FIG. 17 diagrammatically shows an ellipsoid with foci at points m and n. The distance of line nq plus qm is the same as the distance of combined line np plus pm. Therefore, in FIG. 18, light emitted from emitter unit 16 and effectively from center point 18 of emitter unit 16 follows path t or path s which paths both traverse the same distance into eye 10. In this embodiment, the focal point of the rays from reflection points t or s are directed at focal point 90. Focal point 90 is at or very close to the cornea 92 of eye 10. The foci of reflector screen is 18 and 90. This semi-spherical ellipsoid position (FIG. 18) generally permits only straight on vision. In other words, to achieve the augmented visual experience, the user must look straight forward and not side to side. Reflective screen 86 has an ellipsoid surface which is semi-spherical 88.

FIG. 19 shows the semi-spherical ellipsoid surface 88 where the distance traveled by w optic ray or u optic ray is focused to eye center point 50. Eye centerpoint 50 is one of the foci of the ellipsoid. In this manner, when eye 10 rotates as shown by the dashed line v, the optical image is directed into the interior of the eye.

The reflective screens do not block inboard directed or ambient light. Therefore, this inboard directed ambient light mixes optically with the emitted-reflected light and the combination forms an augmented reality for the user. The reflector may be characterized as a thin screen such that non-reflected emitter rays traversing the reflector plate are minimal.

The claims appended hereto are meant to cover modifications and changes within the scope and spirit of the present invention.

What is claimed is:

1. A method of viewing a projected image with a head mounted display worn by a user comprising:
    focusing said projected image with a multi-element lens system with rotationally symmetric aspheric surfaces;
    using an ellipsoid as a pupil relay as part of said head mounted display, said ellipsoid relay having a first and a second foci;
    projecting, from said first foci of the ellipsoid relay, said projected image through said multi-element lens system; and,
    focusing said projected image at said second foci of said ellipsoid relay, said second foci at or near (i) a pupil of said user's eye, or (ii) a center of said user's eye.

2. A method of viewing a projected image as claimed in claim 1 wherein the focusing of said projected image with said multi-element lens system includes refraction of said projected image through three lens elements adjacent said first foci.

3. A method of viewing a projected image as claimed in claim 1 wherein the focusing of said projected image with said multi-element lens system includes refraction of said projected image through two lens elements adjacent said first foci.

4. A method of viewing a projected image as claimed in claim 1 wherein said projected image is projected from a projection surface which is either substantially flat or is slightly curved and said projected image is transmitted directly said multi-element lens system includes refraction of said projected image through three lens elements, said projected image being projected from said projection surface substantially at said first foci.

5. A method of viewing a projected image as claimed in claim 1 wherein said projected image is projected from a projection surface which is a biconical surface substantially at said first foci and wherein said projected image is transmitted directly, said multi-element lens system includes refraction of said projected image through a two lens system having two non-rotationally symmetric aspheric surfaces.

6. A method of viewing a projected image with a head mounted display worn by a user comprising:
    focusing said projected image with a multi-element lens system with rotationally symmetric aspheric surfaces;

using an ellipsoid as a pupil relay as part of said head mounted display;

projecting, from a first foci of the ellipsoid relay, said projected image through said multi-element lens system, wherein projecting said projected image from said first foci includes projecting said image from an outboard position of said user's eye; and, focusing said projected image at a second foci of said ellipsoid relay, said second foci at or near (i) a pupil of said user's eye, or (ii) a center of said user's eye.

7. A method of viewing a projected image as claimed in claim 3 wherein projecting said projected image from said first foci includes projecting said image from an inboard position of said user's eye, intermediate said user's eye and a user's nose.

8. A head mounted display worn by a user to view a projected image comprising:

an image projector with an adjacent multi-element lens system with rotationally symmetric aspheric surfaces focusing said projected image at an ellipsoid as a pupil relay as part of said head mounted display;

said image projector substantially fixed at a first foci of the ellipsoid relay by said head mounted display;

said ellipsoid relay focusing said projected image at a second foci of said ellipsoid relay, said second foci at or near (i) a pupil of said user's eye, or (ii) a center of said user's eye.

9. A head mounted display to view a projected image as claimed in claim 8 wherein said a multi-element lens system with rotationally symmetric aspheric surfaces includes three lens elements adjacent said image projector.

10. A head mounted display to view a projected image as claimed in claim 9 wherein said image projector is either flat or substantially flat.

11. A head mounted display to view a projected image as claimed in claim 8 wherein said image projector is fixed by said head mounted display at a position outboard of said user's eye.

12. A head mounted display to view a projected image as claimed in claim 10 wherein said image projector is fixed by said head mounted display at a position outboard of said user's eye.

13. A head mounted display worn by a user to view a projected image comprising:

an image projector with an adjacent multi-element lens system with non-rotationally symmetric aspheric surfaces focusing said projected image at an ellipsoid as a pupil relay as part of said head mounted display;

said image projector substantially fixed at a first foci of the ellipsoid relay by said head mounted display;

said ellipsoid relay focusing said projected image at a second foci of said ellipsoid relay, said second foci at or near (i) a pupil of said user's eye, or (ii) a center of said user's eye;

wherein said symmetric aspheric surfaces includes two lens elements adjacent said image projector fixed by said head mounted display at a position inboard of said user's eye intermediate said user's eye and a user's nose.

14. A head mounted display to view a projected image as claimed in claim 13 wherein image projector has a biconical surface.

15. A head mounted display to view a projected image as claimed in claim 8 wherein said image projector is an organic light emitting diode or a curved silicon light emitting diode.

16. A head mounted display to view a projected image as claimed in claim 14 wherein said image projector is an organic light emitting diode or a curved silicon light emitting diode.

17. A method of viewing a projected image with a head mounted display worn by a user comprising:

using an ellipsoid as a pupil relay as part of said head mounted display;

projecting, from a first foci of the ellipsoid relay, a projected image through a multi-element lens system;

focusing projected image rays with a multi-element lens system at a second foci of said pupil relay wherein the rays emitted from the lens systems are collimated by said relay producing an image that appears at infinity.

18. A method of viewing a projected image with a head mounted display as claimed in claim 17 wherein said lens system includes rotationally symmetric aspheric surfaces mounted outboard of a nose of said user.

19. A method of viewing a projected image with a head mounted display as claimed in claim 17 wherein said lens system includes non-rotationally symmetric aspheric surfaces mounted inboard with respect to a nose of said user.

* * * * *